July 30, 1963  J. S. HILL  3,099,575

THERMOCOUPLE

Filed Oct. 20, 1959

*INVENTOR.*
JAMES S. HILL

BY Karl Huber
James E. Bryan
Alan C. Rose
ATTORNEYS 3,099,575
THERMOCOUPLE
James S. Hill, Cranford, N.J., assignor, by mesne assignments, to Engelhard Industries, Inc., Newark, N.J., a corporation of Delaware
Filed Oct. 20, 1959, Ser. No. 847,608
11 Claims. (Cl. 117—212)

The present invention deals with a thermocouple and more particularly with the method of making a thermocouple.

The method of the invention comprises bonding a pair of thin films of electrically dissimilar metals to a refractory support and joining the films to each other in the form of a thermocouple, wherein one of the films is composed of at least one of the metals selected from the group consisting of platinum, palladium, rhodium, iridium and gold and the other film consists of an alloy of at least two metals selected from the group consisting of platinum, palladium, rhodium, iridium and gold, the metals being in finely divided form admixed with a liquid vehicle and painted or sprayed on the refractory support.

It is an object of the invention to provide a method of making a thermocouple in the form of thin adherent films or coatings of electrically dissimilar metals spread on a refractory support.

It is another object of the invention to provide an economical single use precious metal thermocouple.

It is a further object of the invention to provide a method of making a thermocouple, whereby the composition of the thermocouple component films is easily adjusted for required E.M.F. output.

It is a still further object of the invention to provide a plurality of connected thermocouples in the form of a thermopile bonded to a refractory support.

Other objects and advantages of the invention will become apparent from the description hereinafter following and the drawings forming a part hereof, in which.

The method of the invention comprises preparing at least two separate stock lots, one being a mixture of at least one finely divided metal selected from the group consisting of platinum, palladium, rhodium, iridium and gold, e.g. platinum or a mixture of platinum and rhodium, and an organic vehicle such as glycerine, oleic acid, castor oil, sulfonated castor oil, turpentine, glue, rosin or synthetic resins dispersed in a liquid, etc., and a second stock lot comprising a mixture of at least two metals selected from the above-mentioned group e.g. a mixture of palladium and gold, admixed with an above-mentioned organic vehicle. First one mixture is applied to a refractory electrically non-conductive support, e.g. a ceramic support in the form of a rod or plate of porcelain, fused quartz, glass, calcined clay, alumina, etc., in the form of a narrow band or film by painting or spraying and secondly another mixture is applied to the support in the form of a narrow band by painting or spraying with the bands overlapping at one end to form a junction thereof. Having applied the films to the support, the composite thermocouple is heat treated at a suitable temperature, e.g. up to about 800° C., preferably between 400° C.–800° C., in air for a period sufficient for the organic vehicle to be substantially completely removed by oxidation. Thereafter, the composite thermocouple is further heat treated at a higher temperature, e.g. from about 1000° C. to about 1700° C., to substantially completely sinter the films and bond them to the support and form alloys of mixed powders by diffusion in situ.

Figure 1:
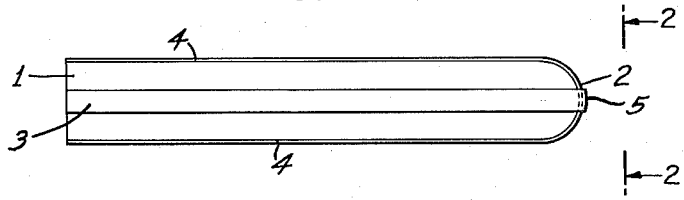
FIGURE 1 illustrates an elevational view of a thermocouple of the invention.
Figure 2:
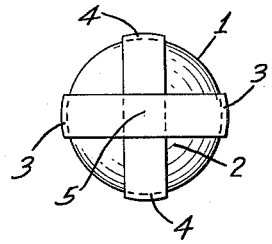
FIGURE 2 illustrates an end view of FIGURE 1 along lines 2—2.

Regarding FIGURES 1 and 2, the invention comprises a refractory rod 1 having a rounded end 2, with the rod composed, for example, of fused quartz. A film strip 3 of, for example, platinum is bonded to the rod and extends longitudinally thereof to the end 2, or is otherwise in the form of a U-shaped strip passing over the end 2 of rod 1 and extends longitudinally of the rod. Another film strip 4 of, for example, an alloy of 90% platinum–10% rhodium is bonded to the rod 1 and extends longitudinally thereof to the end 2, or is otherwise in the form of a U-shaped strip passing over the end 2 and extends longitudinally of the rod. The strips or films are spaced from each other circumferentially of the rod and are joined to each other at the end 2 of the rod forming a thermocouple junction 5.

Figure 3:
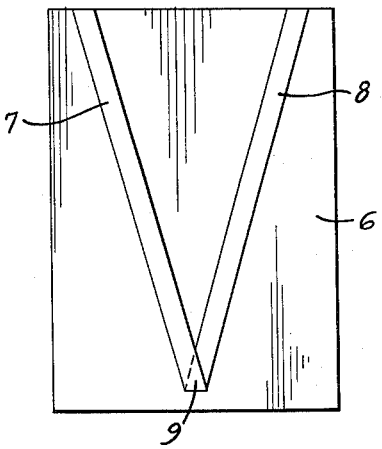
FIGURE 3 illustrates a modification of the invention.

FIGURE 3 illustrates a modification of the invention and comprises a porcelain plate 6 having a V-shaped thermocouple bonded thereto. The thermocouple comprises a film strip leg 7 composed, for example, of palladium and film strip leg 8 composed, for example, of 60% gold–40% palladium, the legs being joined at 9 to form the thermocouple junction.

Figure 4:
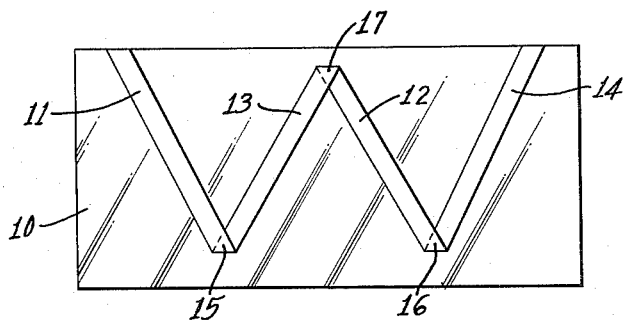
FIGURE 4 illustrates a thermopile composed of thermocouples of the invention.

FIGURE 4 illustrates another modification of the invention in the form of a W-shaped thermopile bonded to a plate 10 of high temperature glass material, the thermopile legs 11 and 12 being composed of, for example, 95% platinum–5% rhodium and the thermopile legs 13 and 14 being composed, for example, of 80% platinum–20% rhodium, the legs 11 and 13 and 12 and 14 being joined, respectively, at hot junctions 15 and 16, and legs 12 and 13 being joined at cold junction 17.

The thermocouple film strips as above illustrated are preferably of a width between about 1 mil and about 50 mils, e.g. 30 mils, and have a thickness preferably between about 5 microns to about 90 microns, e.g. 30 microns.

Among the various thermocouple component compositions contemplated the following are listed as examples.

Positive lead:
90% Pt–10% Rh
87% Pt–13% Rh
80% Pt–20% Rh
95% Pt–5% Ir
Pt
52% Pt–35% Pd–13% Au
Pd
60% Ir–40% Rh Negative lead:
Pt
Pt
95% Pt–5% Rh
Pt
Pt—5% to 10% Au
65% Au–35% Pd
Pd—10% to 60% Au
Ir The following are examples of the method of the invention:

*Example I*

One ounce of finely divided platinum powder was placed in a shallow dish and admixed with sufficient glycerine to form a creamy paste. One ounce of a mixture of 90 parts finely divided platinum and 10 parts of finely divided rhodium was ball milled for one hour and then admixed in a shallow dish with sufficient glycerine to form a creamy paste. The platinum-glycerine mixture was painted in the form of a film strip on a cylindrical fused quartz rod longitudinally thereof and extending over an end of the rod and having a width of 30 mils with a thickness of 30 microns. The platinum-rhodium-glycerine mixture was painted on the rod longitudinally thereof in the form of a film 30 mils wide and 30 microns in thickness. The films overlapped at the end of the rod. The painted rod was heated slowly from room temperature to 800° C. in air until the glycerine was substantially completely removed by oxidation. Thereafter the rod was transferred to a high temperature furnace and heat treated at a temperature of 1300° C. until the film compositions were firmly bonded to the support, the platinum film was completely sintered, and the platinum-rhodium mixture components were completely sintered forming an alloy of the components by diffusion in situ.

*Example II*

One ounce of a first mixture of 95 parts of platinum and 5 parts rhodium, both in finely divided form was ball milled for an hour and admixed in a shallow dish with sufficient turpentine to form a thin easily flowing paste. One ounce of a second mixture of 80 parts platinum and 20 parts rhodium was ball milled for an hour and admixed with sufficient turpentine to form an easily flowing paste. The first mixture paste was painted on a fused quartz plate in the form of a diagonal film strip 10 mils wide and 10 microns in thickness. The second mixture paste was painted on the plate in a diagonal line 10 mils wide and 10 microns in thickness and forming a V-shaped structure with the ends of both films overlapping. The painted plate was heated slowly in air to about 700° C. until the turpentine vehicle was substantially completely removed. There the plate was transferred to a high temperature furnace and heat treated at 1400° C. until the film composition of each film was completely sintered to form respective alloys of the film components by diffusion in situ.

*Example III*

One ounce of finely divided palladium powder was placed in a shallow dish and admixed with sufficient castor oil to form a light creamy paste. One ounce of a mixture of 40 parts palladium and 60 parts gold, both in finely divided form, was ball milled for two hours and admixed with sufficient castor oil to form a light paste. The first mixture was painted on porcelain plate in the form of a diagonal band 25 mils wide and 20 microns in thickness. The second mixture was painted on the plate in the form of a diagonal band 25 mils wide and 20 microns in thickness and forming a V-shaped structure with the first painted band and overlapping at one end. The painted plate was slowly heated in air to about 650° C. until the castor oil was substantially completely removed. The plate was thereafter transferred to a high temperature furnace and heat treated at 1000° C. until the film compositions were firmly bonded to the support, the first film was completely sintered, and the second film components formed an alloy by diffusion in situ.

*Example IV*

A platinum paste was prepared by mixing 16.2 grams of platinum black in 7.8 grams of a medium consisting of 40% rosin WW grade and 60% of terpineol. The rosin was dissolved at 130–135° C. in the terpineol and the solution was adjusted with terpineol to a Gardner-Holdt viscosity of between U and V bubbles at 25° C. The platinum black was thoroughly dispersed in the medium by roll milling in a three-roll paint mill twice. Said mill provides a shearing action on the platinum black medium mixture by picking up the paste on the faster of pairs of rolls turning in opposite directions. Another paste was prepared by mixing 16 grams of a mixture of 90 parts platinum black and 10 parts rhodium black in the same manner as the platinum metal paste. The platinum-medium mixture was painted in the form of a film strip on a cylindrical fused quartz rod longitudinally thereof and extending over an end of the rod and having a width of 30 mils with a thickness of 30 microns. The platinum-rhodium-medium mixture was painted on the rod longitudinally thereof in the form of a film 30 mils wide and 30 microns in thickness. The films overlapped at the end of the rod. The painted rod was heated slowly from room temperature to 800° C. in air until the medium was substantially completely removed by oxidation. Thereafter the rod was transferred to a high temperature furnace and heat treated at a temperature of 1300° C. until the film compositions were firmly bonded to the support, the platinum film was completely sintered, and the platinum-rhodium mixture components were completely sintered and diffused to form an alloy of the components in situ.

The thermocouple according to Example IV was tested electrically and compared against standard performance of a conventional thermocouple of the same composition as given by the United States Bureau of Standards. The results were as follows:

| T., °C. | Millivolts as determined | Standard millivolts | Difference | T., °C., approx. difference |
|---|---|---|---|---|
| 1100 | 10.703 | 10.741 | −.037 | −3 |
| 1200 | 11.901 | 11.935 | −.034 | −3 |
| 1300 | 13.094 | 13.138 | −.044 | −4 |

Having made the above comparison, a small amount of rhodium powder was added to the platinum-rhodium stock mixture, the method of Example IV was again repeated, and it was found that the thermocouple was there-Example IV with each giving constant standard readings. Thereafter, many thermocouples were made according to Example IV with each giving constant standard readings.

Experimentation included a departure from Example IV only in that one film was painted on the rod support, the film was applied from only the platinum-rhodium stock lot. In this case the completed structure was in the form of a supported resistance film composed of the alloy formed in situ and which exhibited similar electrical characteristics of a conventional wire of the same composition. The advantage of this method for manufacturing supported resistance members is that the resistance characteristics can be easily adjusted by adjusting the amount of one of the stock lot powder components. A film from the platinum stock lot can be applied in similar manner.

Thermocouples of the type herein contemplated are especially useful and are more economical for single use thermocouples than are those of conventional construction. The resistance film members or thermocouple elements of the invention are more rugged than thin conventional wires. In order to further safeguard the thermocouples against handling etc., the thermoelectric films, including the support, are coated with a protective layer of lacquer or plastic material.

Various modifications of the invention are contemplated within the scope of the appended claims.

What is claimed is:

1. The method of bonding a thin film substantially narrow resistance element composed of an alloy of at least two metals selected from the group consisting of platinum, palladium, iridium, rhodium and gold on a refractory support, comprising mixing said metals in finely divided condition with an organic liquid vehicle, applying the resultant mixture on the support in the form of a substantially narrow film, heat treating the support and film at a temperature up to about 800° C. in air until the organic vehicle is substantially completely removed by oxidation, and thereafter further heat treating the support and film at a temperature from about 1000° C. to about 1700° C. and below the melting points of the metals until the mixed metals are completely alloyed by diffusion in situ and firmly bonded to the support.

2. The method of making a supported thermocouple comprising mixing a first mixture of at least one finely divided metal selected from the group consisting of platinum, palladium, iridium, rhodium and gold with an organic liquid vehicle, mixing a second mixture of at least two finely divided metals selected from the said group with an organic liquid vehicle to provide another dissimilar mixture, applying one of the mixtures on a refractory support, the mixture being applied as a substantially narrow film, applying the other mixture on the support, the other mixture being applied in the form of a substantially narrow film with a portion thereof overlapping the first applied mixture, heat treating the support and films at a temperature up to about 800° C. in air until the organic vehicle is substantially completely removed by oxidation, and thereafter further heat treating the support and films at a temperature from about 1000° C. to about 1700° C. and below the melting points of the metals until each film is bonded to the support and completely alloyed by diffusion in situ.

3. The method according to claim 2, wherein one mixture is composed of platinum and an organic liquid vehicle and the other of an alloy of platinum and rhodium and an organic liquid vehicle.

4. The method according to claim 2, wherein one mixture comprises a platinum-rich platinum-rhodium mixture and the other mixture comprises a platinum-rich platinum-rhodium mixture with the rhodium content of one mixture varying from the rhodium content of the other mixture.

5. The method according to claim 2, wherein one mixture is composed of palladium and an organic liquid vehicle and the other of a mixture of palladium and from 10% to 60% gold and an organic liquid vehicle.

6. The method according to claim 2, wherein one mixture is composed of platinum and an organic liquid vehicle and the other of platinum and from 5% to 10% gold and an organic liquid vehicle.

7. The method according to claim 2, wherein one mixture is composed of platinum and an organic liquid vehicle and the other of a platinum-iridium mixture and an organic liquid vehicle.

8. The method according to claim 2, wherein the support is in the form of a refractory rod.

9. The method according to claim 2, wherein the support is in the form of a refractory plate.

10. The method according to claim 8, wherein the rod is composed of fused quartz.

11. The method according to claim 9, wherein the plate is composed of fused quartz.

References Cited in the file of this patent

UNITED STATES PATENTS

| | | |
|---|---|---|
| 603,296 | Tooker | May 3, 1898 |
| 1,789,733 | Feuszner | Jan. 20, 1931 |
| 1,922,254 | McCulloch | Aug. 15, 1933 |
| 2,323,169 | Wagenhals | June 29, 1943 |
| 2,406,172 | Smithells | Aug. 20, 1946 |
| 2,429,088 | Box | Oct. 14, 1947 |
| 2,429,089 | Box | Oct. 14, 1947 |
| 2,440,691 | Jira | May 4, 1948 |
| 2,629,757 | McKay | Feb. 24, 1953 |
| 2,693,023 | Kerridge et al. | Nov. 2, 1954 |
| 2,757,104 | Howes | July 31, 1956 |